United States Patent [19]

Walus

[11] 3,821,145

[45] June 28, 1974

[54] AQUEOUS COATING COMPOSITION OF AN ACRYLIC GRAFT COPOLYMER, A LINEAR ACRYLIC POLYMER AND A CROSS-LINKING AGENT

[75] Inventor: Aloysius N. Walus, Flint, Mich.

[73] Assignee: E. I. du Pont de Nemours and Company, Wilmington, Del.

[22] Filed: Dec. 22, 1972

[21] Appl. No.: 317,376

[52] U.S. Cl..... 260/29.4 UA, 117/75, 260/29.6 NR, 260/29.6 TA, 260/29.6 WB, 260/29.7 W, 260/851, 260/856, 260/876, 260/885

[51] Int. Cl. ... C08g 37/30, C08f 37/06, C08g 51/24

[58] Field of Search ............ 260/29.4 UA, 29.6 TA, 260/29.6 WB, 851, 885, 29.7 W, 29.6 NR

[56] References Cited
UNITED STATES PATENTS

| | | | |
|---|---|---|---|
| 2,963,453 | 12/1960 | Hwa et al. | 260/2.2 |
| 3,651,005 | 3/1972 | Walus | 260/31.2 |
| 3,660,537 | 5/1972 | Fryd et al. | 260/885 |
| 3,716,506 | 2/1973 | Simms et al. | 260/22 CB |
| 3,729,439 | 4/1973 | Parker | 260/29.7 W |
| 3,746,673 | 7/1973 | Simms et al. | 260/22 CB |

*Primary Examiner*—Melvin Goldstein
*Assistant Examiner*—W. C. Danison

[57] ABSTRACT

The aqueous coating composition contains 2–50 percent of a film-forming binder in an aqueous medium and the binder comprises the following components:

1. an acrylic polymer which comprises a graft copolymer having the general structure A—B where A is the backbone segment and B is the graft segment; the acrylic polymer is formed by polymerizing the following monomer units to form the backbone segment A methylmethacrylate, an alkyl methacrylate or an alkylacrylate, a hydroxalkylacrylate or methacrylate, a polymerizable carboxylic acid such as acrylic acid or methacrylic acid, and a grafting site monomer such as allymethacrylate to which a side chain segment B is grafted of acrylamide or methacrylamide and optionally a hydroxyalkylacrylate or a hydroxyalkylmethacrylate;
2. a linear acrylic polymer of methyl methacrylate, an alkyl acrylate or an alkyl methacryate, a hydroxyalkyl acrylate or a hydroxyalkyl methacrylate, and an ethylenically unsaturated carboxylic acid which is 75–100 percent neutralized with ammonia or an amine; and
3. a water-dispersible cross-linking resin such as hexakis(methoxymethyl) melamine;

the novel coating composition forms a high quality finish for automobile and truck bodies and also can be utilized for appliances such as refrigerators and stoves and for cabinets and the like.

13 Claims, No Drawings

AQUEOUS COATING COMPOSITION OF AN ACRYLIC GRAFT COPOLYMER, A LINEAR ACRYLIC POLYMER AND A CROSS-LINKING AGENT

BACKGROUND OF THE INVENTION

This invention relates to an aqueous based coating composition and in particular to an aqueous acrylic coating composition that provides a high quality finish for the exterior of automobile and truck bodies.

Solvent based thermosetting acrylic enamels are well-known in the art as shown by Frazer et al. U.S. Pat. No. 2,681,897, issued June 22, 1954; Vasta U.S. Pat. No. 3,338,860, issued Aug. 29, 1967; Fisk et al. U.S. Pat. No. 3,365,414, issued Jan. 23, 1968 and Parker U.S. Pat. No. 3,367,546, issued Jan. 25, 1972. Organosols are known in the art as shown by Thompson U.S. Pat. No. 3,382,297, issued May 7, 1968. Organsols that utilized a graft copolymer to stabilize the organosols are taught by Schmidle et al., U.S. Pat. No. 3,232,903, issued Feb. 1, 1966 and Osmond U.S. Pat. No. 3,317,635, issued May 2, 1967. However, both the conventional thermosetting acrylic enamels and the organosol compositions are solvent based systems that do not meet the needs for the automobile and truck manufacturing industries for a non-airpolluting finish. Taft U.S. Pat. No. 3,661,827, issued May 9, 1972, is directed to a process for preparing a water-dispersible acrylic enamel but this product does not meet the high requirements of the automobile and truck manufacturing industry.

Aqueous acrylic graft copolymer coating compositions in which the graft copolymer has a water-soluble side chain, for example, a hydroxy alkyl acrylate or methacrylate side chains, are shown in Parker Ser. No. 139,203, filed Apr. 30, 1971 now U.S. Pat. No. 3,729,439. However, when a cross-linking agent such as an alkylated melamine formaldehyde resin is added to these compositions, the resulting composition is not stable and either gel particles form within a short period of time or the composition gels completely in several days.

The novel aqueous acrylic coating composition of this invention utilizes a graft copolymer with water-soluble side chains in combination with an at least partially neutralized linear acrylic polymer and a water-dispersible or water-soluble cross-linking agent to provide a non-airpolluting high quality finish for the exterior of automobile and truck bodies.

SUMMARY OF THE INVENTION

The aqueous coating composition has a film-forming binder content of about 2–60 percent by weight and correspondingly, 40–98 percent by weight of water and can contain up to 20 percent by weight solvent for the binder; wherein the binder consists essentially of 1. 40–70 percent by weight, based on the weight of the binder, of an acrylic polymer that comprises a graft copolymer that has the general structure A—B; where A is the backbone segment and comprises 65–93 percent by weight of the copolymer and B is the graft side chain segment that comprises 35–7 percent by weight of the graft copolymer; the acrylic polymer is formed by polymerizing the following monomer units to form the backbone segment A a. 55–80 percent by weight, based on the weight of the graft copolymer, of at least 25 percent by weight of methyl methacrylate, and an alkyl methacrylate that has two to 12 carbon atoms in the alkyl group or an alkyl acrylate that has one to 8 carbon atoms in the alkyl group;
   b. 2–20 percent by weight, based on the weight of the graft copolymer, of a hydroxyalkyl acrylate or a hydroxyalkyl methacrylate each having two to four carbon atoms in the alkyl group;
   c. 1–8 percent by weight, based on the weight of the graft copolymer, of an α,β-ethylenically unsaturated carboxylic acid;
   d. 0.5–3 percent by weight, based on the weight of the graft copolymer, of a monomer which is a grafting site for the side chain segment that has the formula

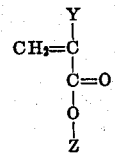

where Y is hydrogen, $CH_3$, or $CH_2$—$CH_3$ and Z is

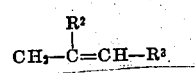

where $R^2$ and $R^3$ are Y; and polymerizing the following monomers with the above reaction product to form the side chain segment (B) of the graft copolymer
   e. 7–20 percent by weight, based on the weight of the graft copolymer, of acrylamide or methacrylamide, and
   f. 0–15 percent by weight, based on the weight of the graft copolymer, of a hydroxyalkyl acrylate or a hydroxyalkyl methacrylate each having two to four carbon atoms in the alkyl group; wherein the graft copolymer has a relative viscosity of about 1.1–1.3 measured at 25°C. using 0.5 percent polymer solution in dichloroethylene;

2. 10–30 percent by weight, based on the weight of the binder, of a linear acrylic polymer of
   a. 30–75 percent by weight, based on the weight of the acrylic polymer, of methyl methacrylate;
   b. 15–52 percent by weight, based on the weight of the acrylic polymer, of an alkyl methacrylate having two to 12 carbon atoms in the alkyl group or an alkyl acrylate having one to eight carbon atoms in the alkyl group;
   c. 2–10 percent by weight, based on the weight of the acrylic polymer, of a hydroxyalkyl acrylate or a hydroxyalkyl methacrylate, each having two to four carbon atoms in the alkyl group;
   d. 2–8 percent by weight, based on the weight of the acrylic polymer, of an α,β-ethylenically unsaturated carboxylic acid;

wherein the acrylic polymer has a relative viscosity of about 1.04–1.11 measured as indicated above and the acrylic polymer is 75–100 percent neutralized with ammonia or an amine;

3. 20–40 percent by weight, based on the weight of the binder, of a water-dispersible or water-soluble cross-linking resin.

DESCRIPTION OF THE INVENTION

The novel aqueous coating composition of this invention has a solids content of about 2–60 percent by weight preferably about 20–50 percent by weight. The novel composition is usually pigmented and contains about 0.1–30 percent by weight pigment.

The film forming binder of the novel coating composition comprises 40–70 percent by weight of an acrylic polymer that comprises a graft copolymer having the general structure A—B, 10–30 percent by weight of a linear acrylic polymer and 20–40 percent by weight of a water-dispersible or water-soluble cross-linking resin. Preferably, the novel composition contains 40–55 percent by weight of the acrylic polymer which comprises the graft copolymer, 15–20 percent by weight of the linear acrylic polymer and 25–35 percent by weight of an alkylated melamine formaldehyde resin which preferably is hexakis(methoxy)melamine.

The acrylic polymers utilized in the novel coating composition of this invention are partially soluble and partially dispersed in the aqueous medium. About 30–60 percent by weight of the acrylic polymers are dispersed and have a particle size about 0.01–0.10 microns and preferably about 0.02–0.06 microns and the residual 40–70 percent by weight of the acrylic polymers are dissolved in the aqueous medium.

An acrylic polymer that comprises a graft copolymer is utilized in the novel coating composition of this invention. The graft copolymer has the general structure A—B where A is the backbone segment and comprises about 65–93 percent by weight of the copolymer and B is the grafted site side chain segment that comprises 35–7 percent of the graft copolymer. Preferably, the graft copolymer comprises 75–88 percent by weight of the backbone segment A and correspondingly 12–25 percent by weight of the side chain segment B.

The graft copolymer is prepared by polymerizing together the monomer units for the backbone segment A and after the backbone segment A is formed side chain segment monomers are added thereto and polymerized to form the graft copolymer. However, the grafting efficiency can vary and about 30–90 percent by weight of graft copolymer is formed with about 10–70 percent by weight of homopolymer segments and copolymer segments. It is preferred to have 60–95 percent by weight of graft copolymer formed in the reaction.

The resulting graft copolymer has a relative viscosity of about 1.1–1.3 measured at 25°C using 0.5 percent polymer solids in dichloroethylene solvent. Preferably, the graft copolymer has a relative viscosity of about 1.15–1.25.

The backbone segment of A of the graft copolymer is prepared by polymerizing the following monomers:

a. 55–80 percent by weight, based on the weight of the graft copolymer, of at least 25 percent by weight of methylmethacrylate monomer with a corresponding amount of alkylmethacrylate monomer that has two to 12 carbon atoms in the alkyl group or an alkylacrylate monomer that has one to eight carbon atoms in the alkyl group;

b. 2–20 percent by weight, based on the weight of the graft copolymer, of a hydroxyalkylacrylate or a hydroxyalkylmethacrylate each has two to four carbon atoms in the alkyl group;

c. 1–8 percent by weight, based on the weight of the graft copolymer, of an ethylenically unsaturated carboxylic acid;

d. 0.5–3 percent by weight, based on the weight of the graft copolymer of a monomer which is a grafting site for the side chain segment B and has the formula

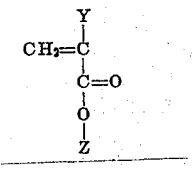

where Y is hydrogen, $CH_3$ or $CH_2CH_3$ and Z is

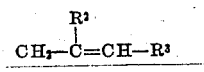

where $R_2$ and $R_3$ are Y.

Typical alkylmethacrylates that can be used to prepare the backbone segment along with methyl methacrylate are ethyl methacrylate, propylmethacrylate, isopropylmethacrylate, butylmethacrylate, pentylmethacrylate, hexylmethacrylate, 2-ethylhexylmethacrylate, octylmethacrylate, lauryl methacrylate and the like.

Typical alkylacrylates that can be used are methylacrylate, ethylacrylate, proplyacrylate, butylacrylate, pentylacrylate, hexylacrylate, 2-ethylhexylacrylate, octylacrylate, and the like.

Hydroxyalkylacrylates or methacrylates that can be used are as follows: 2-hydroxyethylacrylate, 2-hydroxypropylacrylate, 2-hydroxybutylacrylate, 2-hydroxyethylmethacrylate, 2-hydroxypropylmethacrylate, 2-hydroxybutylmethacrylate and the like.

$\alpha,\beta$-Ethylenically unsaturated carboxylic acids that are used to prepare the backbone of the graft copolymer are as follows: acrylic acid, methacrylic acid, itaconic acid, propylacrylic acid, crotonic acid, and the like. Preferably, acrylic acid methacrylic acid are utilized.

The monomers which provide the grafting site side chain segment B preferably are alkyl methacrylate and allyl acrylate.

In general, the polymerization procedure used to prepare the backbone segment A and the side chain segment B of the graft copolymer is to react the monomers at about 75°–150°C. for about 2–6 hours in water-misicible solvents using conventional polymerization catalysts.

Typical water-miscible solvents that are used in a polymerization process are isopropanol, and propyl alcohol, diacetone alcohol, and other alcohols, acetone, acetyl acetone, ethylene glycol monoethyl ether, ethylene glycol monobutyl ether, ethylene glycol monomethyl ether acetate, diethylene glycol monobutyl ether, diethylene glycol diethyl ether and the like. Minor amounts of solvents of limited water-solubility can be used, such as methylethyl ketone, ethylene glycol monoethyl ether acetate. The resulting novel coating composition of this invention can contain up to about 20 percent by weight of the water-miscible solvent, but preferably contains 5-15 percent by weight of these solvents. If desired the novel composition can be made solvent free.

About 0.1-4 percent by weight, based on the weight of the monomer of the polymerization catalyst is used to prepare the acrylic graft copolymer. Typical catalysts are azo,bis-isobutyronitrile, azo-bis-(α,γ-dimethyl dimethylvaleronitrile), benzoyl peroxide, tertiary butyl peroxy pivalate, tertiary butyl peracetate and the like. A chain transfer agent such as lauryl mercaptan can also be used.

After the backbone segment A in the graft copolymer is prepared the side chain monomers are added to the reaction mixture to form the graft copolymer. The side chain monomers comprise 7-20 percent by weight, based on the weight of the graft copolymer, of either acrylamide or methacrylamide and the side chain can optionally contain up to 0-15 percent by weight, based on the weight of the graft copolymer of any of the aforementioned hydroxyalkylacrylates or hydroxyalkylmethacrylates.

One preferred graft copolymer comprises the following:

1. 75-88 percent by weight of the backbone segment A of 60-80 percent by weight of monomers of at least 28 percent by weight of methylmethacrylate monomer and the corresponding percentage of an alkylmethacrylate monomer having two to four carbon atoms in the alkyl group preferably butylmethacrylate monomer; 4-12 percent by weight of 2-hydroxy ethylacrylate or 2-hydroxypropylmethacrylate, 3-6 percent by weight of acrylic acid or methacrylic acid; 1-2 percent by weight of allylmethacrylate;

2. 12-25 percent by weight side chain segment B of 0-12 percent by weight of hydroxyethylacrylate or hydroxypropylmethacrylate and 8-14 percent by weight of acrylamide; wherein the polymer has a relative viscosity of 1.15-1.25 measured as indicated above.

Other highly useful acrylic graft copolymers are as follows:

Graft Copolymer A

| Backbone Segment | Percent by Weight |
|---|---|
| Methylmethacrylate | 32-36% |
| Butylmethacrylate | 35-39% |
| 2-Hydroxyethylacrylate | 6-10% |
| Acrylic Acid | 2- 5% |
| Allylmethacrylate | 1- 2% |
| Side Chain Segment | Percent by Weight |
| 2-Hydroxyethylacrylate | 2- 6% |
| Acrylamide | 10-14% |

Graft Copolymer B

| Backbone Segment | Percent by Weight |
|---|---|
| Methylmethacrylate | 32-36% |
| Butylmethacrylate | 38-41% |
| 2-Hydroxyethylacrylate | 6-10% |
| Acrylic Acid | 2- 4% |
| Allylmethacrylate | 1- 2% |
| Side Chain Segment | Percent by Weight |
| Acrylamide | 12-16% |

Graft Copolymer C

| Backbone Segment | Percent by Weight |
|---|---|
| Methylmethacrylate | 27-31% |
| Butylmethacrylate | 38-42% |
| 2-Hydroxyethylacrylate | 10-14% |
| Acrylic Acid | 3- 5% |
| Allylmethacrylate | 1- 2% |
| Side Chain Segment | Percent by Weight |
| 2-Hydroxyethylacrylate | 2- 4% |
| Acrylamide | 10-12% |

Graft Copolymer D

| Backbone Segment | Percent by Weight |
|---|---|
| Methylmethacrylate | 28-32% |
| Butylmethacrylate | 37-41% |
| Hydroxyethylacrylate | 2- 6% |
| Acrylic Acid | 3- 5% |
| Allylmethacrylate | 1- 2% |
| Side Chain Segment | Percent by Weight |
| Hydroxyethylacrylate | 10-14% |
| Acrylamide | 8-12% |

The novel coating composition of this invention contains 10-30 percent by weight of a linear acrylic polymer. This acrylic polymer is prepared by conventional polymerization techniques in which the monomers are reacted at about 75°-125°C. for 2-6 hours to form a polymer that has a relative viscosity of about 1.04-1.1 measured at 25°C. using a 0.5 percent polymer solids in dichloroethylene solvent. The aforementioned polymerization catalysts are utilized and the polymerization is carried out in the water-miscible solvents as mentioned above.

The linear acrylic polymer contains 30-75 percent by weight of methylmethacrylate, 15-52 percent by weight of an alkylmethacrylate that has two to 12 carbon atoms in the alkyl group or an alkylacrylate that has one to eight carbon atoms in the alkyl group, 2-10 percent by weight of hydroxyalkylacrylate or hydroxyalkylmethacrylate each has two to four carbon atoms in the alkyl group and 2-8 percent by weight of an α,β-ethylenically unsaturated carboxylic acid. Any of the aforementioned alkylmethacrylates, alkylacrylates, hydroxyalkylacrylates or methacrylates and carboxylic acid monomers can be used to prepare this linear acrylic polymer.

One preferred linear acrylic polymer contains 45-70 percent by weight of methyl methacrylate, 20-45 percent by weight of butyl acrylate or butyl methacrylate, 5-10 percent by weight of hydroxyethylacrylate or hydroxypropyl methacrylate and 3-5 percent by weight of acrylic acid or methacrylic acid wherein the acrylic polymer has a relative viscosity of 1.04-1.07 measured as indicated above.

The following are preferred linear acrylic polymers that can be utilized in a novel coating composition of this invention:

(I)  46-48% methylmethacrylate,
 38-42% butylmethacrylate,
 4- 8% 2-hydroxyethylacrylate, and
 5- 7% acrylic acid;

-Continued (II) 50–60% methylmethacrylate,
28–32% butylmethacrylate,
6–10% hydroxethylacrylate, and
3– 5% acrylic acid;
(III) 66–70% methylmethacrylate,
18–22% butylacrylate,
6–10% 2-hydroxyethylacrylate, and
3– 5% acrylic acid.

The linear acrylic polymer is 75–100 percent neutralized with ammonia or with an amine to form a water-soluble or water-dispersible polymer before the polymer is blended with the graft copolymer and the cross-linking agent to form the novel coating composition of this invention. The acid constituents of the graft copolymer are not neutralized but are available to catalyze the cross-linking reaction with the alkylated melamine formaldehyde resin. The neutralized linear acrylic polymer aids in the dispersibility of the graft copolymer and the cross-linking agent and forms a stable coating composition. This allows for the formulation of high solids and low viscosity aqueous dispersions that use high molecular weight graft copolymers.

Ammonia or the following typical amines are used to neutralize the linear acrylic polymer: primary amines, secondary amines, tertiary amines, polyamines, hydroxyamines, such as ethanolamine, dimethyl ethanolamine, diethanolamine, triethanolamine, n-methylethanolamine, N,N-diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetramine, hexamethylene tetramine, triethylamine diethylethanolamine, and the like.

The novel coating composition of this invention contains 20–40 percent by weight, based on the weight of the binder of a water-dispersible water-soluble cross-linking resin. Preferably, alkylated melamine formaldehyde resins were used in an amount of 25–35 percent by weight. These alkylated melamine formaldehyde resins have one to four carbon atoms in the alkyl group and are prepared by conventional techniques in which the alkanols such as methanol, ethanol, propanol, isopropanol or butanol is reacted with a malamine formaldehyde resin.

One preferred resin of this type is hexakis-(methoxymethyl)melamine. Melamine resins reacted with isopropanol can also be utilized. Urea formaldehyde resins can also be used as cross-linking agents.

Generally, the novel coating composition of this invention contains pigments in amounts of 0.1–30 percent by weight. A variety of pigments can be used, for example: metallic flakes such as aluminum flake, metallic oxides such as titanium dioxide, iron oxide, zinc oxide and the like, metallic hydroxides, metallic powders, chromates, sulfates, carbonates, carbon black, silica, talc, phthalocyanine blues and greens, indolinone pigments and other organic pigments and dyes.

In the preparation of the novel coating composition of this invention, the pigments are generally formed into a mill base and blended with the aforementioned binder constituents. These mill bases are prepared by conventional techniques in which the pigment is blended with a water-dispersible or water-soluble resin or one of the aforementioned binder resins such as the acrylic graft copolymer, the linear acrylic polymer or the cross-linking resin. The pigment is dispersed by conventional techniques such as sand grinding, ball milling, pebble milling or through the preparation of pigment chips and the subsequented dispersion of these chips in a water-miscible solvent or in water to form a mill base.

In preparing the novel coating composition of this invention, the linear acrylic polymer is neutralized with ammonia or an amine and then blended with the water-soluble or dispersible cross-linking resin and when the graft copolymer is added and the mill bases are then blended into the mixture. The resulting paint is then reduced to an application viscosity with water.

The novel coating composition of this invention can be applied to a variety of substrates such as glass, plastics, metal and the like, by any of the usual application methods such as spraying, electrostatic spraying, dipping, brushing, flow coating, electrocoating and the like. These coatings are baked according to conventional procedures. One preferred baking cycle comprises a prebake at about 75°–95°C. for about 5–30 minutes and then a bake at about 125°–200°C. to provide a high quality finish. The resulting finish is about 0.5–3.5 mils thick, preferably 1–2.5 mils in thickness, and can be rubbed or polished in accordance with conventional techniques to improve smoothness or gloss or both.

The novel coating composition of this invention is preferably applied of a primed metal substrate. Typical alkyd primers and epoxy primers pigmented with iron oxide, carbon black, titanium dioxide can be used. The primer can be applied to the metal substrate by electrodeposition or can be applied by conventional spraying or dipping techniques. Also, the novel composition can be used directly over galvanized steel to form a durable coating.

The novel composition of this invention can be applied directly over a primed metal substrate without the use of an intermediate sealer coat. However, a sealer coat can be used to provide a finish with excellent adhesion and smoothness. These sealers may be water based or solvent based. One typically useful sealer composition is disclosed in Rohrbacker U.S. Pat. No. 3,509,086, issued Apr. 28, 1970.

The finish of the novel coating composition of this invention is characterized by a glossy and smooth appearance that has water spot resistance, excellent craze resistance, good durability and weatherability and gloss retention and has good gasoline resistance. These characteristics make the novel composition particularly attractive as an exterior finish for automobiles and trucks.

The following Examples illustrate the invention. The parts and percentages are by weight unless otherwise specified.

EXAMPLE 1

An acrylic graft copolymer solution is prepared as follows:

| Portion 1 | Parts by Weight |
| --- | --- |
| Methylmethacrylate monomer | 120 |
| Butylmethacrylate monomer | 140 |
| 2-Hydroxyethylacrylate monomer | 26 |
| Acrylic acid monomer | 10 |
| Allyl methacrylate monomer | 4 |
| Diacetone alcohol | 50 |

-Continued

| Portion 1 | Parts by Weight |
|---|---|
| N-propanol | 450 |
| Ethanol | 200 |
| Portion 2 | |
| Azo-bis-isobutyronitrile | 10 |
| Portion 3 | |
| Methyl methacrylate monomer | 220 |
| Butyl methacrylate monomer | 230 |
| 2-Hydroxyethylacrylate | 54 |
| Acrylic acid monomer | 25 |
| Allyl methacrylate monomer | 11 |
| Azo-bis-isobutyronitrile | 6 |
| Portion 4 | |
| Azo-bis-isobutyroniltrile | 4 |
| Portion 5 | |
| 2-Hydroxyethylacrylate | 40 |
| Acrylamide monomer | 120 |
| Deionized water | 140 |
| Ethanol | 100 |
| Portion 6 | |
| Tertiary-butyl peroxy pivalate | 10 |
| Ethanol | 60 |
| Portion 7 | |
| Deionized water | 1700 |
| Total | 3730 |

Portion 1 is pre-mixed and charged into a reaction vessel equipped with a stirrer, a reflux condenser, a heating mantle and a thermometer and the ingredients are heated to about 89°C. in a twenty five minute period. Portion 2 is then added and thoroughly blended with the reaction mixture. Then Portion 3 is added with 40 percent of Portion 3 being added in a thirty minute period. Thirty five percent of Portion 3 is then added over the next thirty minute period and the remaining 25 percent of Portion 3 is blended with Portion 4 and then added over another thirty minute period, while maintaining the reaction mixture at about 89°C. The reaction mixture is maintained at about 89°C. for sixty minutes. Then Portions 5 and 6 are added separately and simultaneously over a thirty minute period. The reaction mixture is maintained at 83°C. for about thirty minutes and Portion 7 is added slowly for a twenty minute period. Then the temperature of the reaction mixture is slowly reduced to about 52°C.

The resulting graft polymer solution has a polymer solids content of about 27 percent and a Gardner Holdt viscosity measured at 25°C. of about K. The polymer has an acid number of about 28 and a relative viscosity of 1.198 measured in dichloroethylene at 0.5 percent polymer solids at 25°C. The polymer theoretically is of the following composition: backbone of 34% methyl methacrylate, 37% butyl methacrylate, 8% hydroxyethyl acrylate, 3.5% acrylic acid, 1.5% allyl methacrylate and graft side chain of 4% 2-hydroxyethyl acrylate, 12% acrylamide.

A linear acrylic polymer solution is prepared as follows:

| Portion 1 | Parts by Weight |
|---|---|
| Diethylene glycol diethylether | 1055 |
| Ethylene glycol monoethyl ether | 362 |
| Isopropanol | 38 |
| Portion 2 | |
| Methyl methacrylate monomer | 720 |
| Butyl methacrylate monomer | 600 |
| 2-hydroxyethylacrylate monomer | 90 |
| Acrylic acid monomer | 90 |
| Ditertiary butyl peroxide | 45 |
| Total | 3000 |

Portion 1 is pre-mixed and charged into a reaction vessel equipped with a thermometer, a stirrer, a reflux condenser and a heating mantle. The ingredients are slowly heated at about 136°C. and then Portion 2 is slowly added over a four hour period, while maintaining the reaction mixture at about 135°C. Then the reaction mixture is maintained at about 130°C. for about an additional sixty minutes.

The resulting polymer solution has a solids content of about 50 percent and a Gardner Holdt viscosity measured at 25°C. of about V. The polymer has an acid number of about 46.7 and a relative viscosity of 1.051 measured at 25°C. in dichloroethylene using 0.5 percent polymer solids solution.

The following coating compositions are then prepared by blending together the following ingredients:

| | A | B | C | D | E | F |
|---|---|---|---|---|---|---|
| Graft Copolymer solution (Prepared above) | 50 | 60 | 40 | 50 | 50 | 60 |
| Linear Acrylic polymer solution | 20 | 30 | 30 | 30 | 20 | 20 |
| Hexakis(methoxymethyl) melamine | 30 | 20 | 30 | 20 | — | — |
| Methylated melamine formaldehyde resin | — | — | — | — | 30 | 20 |

Each of the above prepared coating compositions A–F is prepared as follows:

1. the linear acrylic polymer solution is charged into a mixing vessel and neutralized 85 percent on an equivalent weight basis with dimethylethanol amine;
2. the melamine resin is then added with mixing; and
3. the graft copolymer solution is then added with mixing.

To each of the above prepared coating compositions 1 percent by weight of the defoamer is added and then the compositions are reduced with deionized water to a total solids content of about 20 percent. Each of the coating compositions has a milky appearance and each is stable at room temperature. Each of the above coating compositions is sprayed onto a phosphatized steel panel which is baked for thirty minutes at 135°C. In each case, a clear film is formed which has a good adherence to the substrate and has a smooth glossy appearance.

EXAMPLE 2

A graft copolymer solution is prepared as follows:

| Portion 1 | Parts by Weight |
|---|---|
| Methylmethacrylate monomer | 100 |
| Butylmethacrylate monomer | 150 |
| 2-hydroxyethylacrylate monomer | 40 |
| Acrylic acid monomer | 10 |
| Allyl methacrylate monomer | 4 |
| Diacetone alcohol | 50 |
| n-Propanol | 450 |
| Ethanol | 200 |
| Portion 2 | |
| Azo bis-isobutyronitrile | 10 |
| Portion 3 | |
| Methylmethacrylate monomer | 190 |
| Butylmethacrylate monomer | 250 |
| 2-hydroxyethylacrylate monomer | 80 |
| Acrylic acid monomer | 25 |
| Allyl methacrylate monomer | 11 |
| Azo bis-isobutyronitrile | 6 |
| Portion 4 | |
| Azo bis-isobutyronitrile | 4 |

-Continued

| Portion 1 | Parts by Weight |
|---|---|
| Portion 5 | |
| 2-hydroxyethylacrylate monomer | 20 |
| Acrylamide monomer | 120 |
| Deionized water | 140 |
| Ethanol | 100 |
| Portion 6 | |
| Tertiary-butyl peroxy pivalate | 10 |
| Ethanol | 60 |
| Portion 7 | |
| Deionized water | 1700 |
| Total | 3730 |

Portion 1 is pre-mixed and charged into a reaction vessel equipped with a stirrer, a refluxed condenser, a heating mantle and a thermometer and the ingredients are heated to about 87°C. and then Portion 2 is added while the reaction mixture is at a slight reflux. Forty percent of Portion 3 is then added over a thirty minute period, during the next sixty minutes about 35 percent of Portion 3 is slowly added while maintaining the reaction mixture at its reflux temperature. The remaining 25 percent of Portion 3 is blended with Portion 4 and added over the next thirty minute period while maintaining the reaction mixture at its reflux temperature. The reaction mixture is then held at its reflux temperature for an additional thirty minutes and then Portions 5 and 6, are added separately and simultaneously over the next thirty minutes. Then the reaction mixture is held at about 84°C. for an additional thirty minutes. Portion 7 is then slowly added over a thirty minute period.

The resulting polymer solution has a solids content of about 27 percent and a Gardner Holdt viscosity measured at 25°C. of about D. The polymer has an acid number of about 27.9 and a relative viscosity of 1.250 measured at 25°C. in dichloroethylene using 0.5 percent polymer solution. The graft copolymer has the following theoretical structure: backbone 29% methylmethacrylate, 40% butylmethacrylate, 12% 2-hydroxyethylacrylate, 3.5% acrylic acid, 1.5% allylmethacrylate side chain grafted segment, 2% hydroxyethylacrylate, 12% acrylamide.

A coating composition is prepared as follows:

| | Parts By Weight |
|---|---|
| Graft copolymer solution (prepared above | 50 |
| Linear acrylic polymer solution (prepared in Example 1) | 20 |
| Hexakis(methoxymethyl)melamine | 30 |
| Total | 100 |

A sufficient amount of diethyl ethanol amine is added to neutralize the linear acrylic polymer 100 percent. The ingredients are then blended together. The coating composition is diluted with deionized water to a total solids content of 20 percent. The resulting polymer dispersion has a milky fine appearance and a medium viscosity and is stable at room temperature. The dispersion is sprayed onto a phosphatized steel panel and baked for thirty minutes at 135°C. The film is smooth, even and clear and is resistant to solvents such as methylethyl ketone.

EXAMPLE 3

An acrylic graft copolymer is prepared as follows:

| Portion 1 | Parts by Weight |
|---|---|
| Methylmethacrylate monomer | 128 |
| Butylmethacrylate monomer | 139 |
| 2-hydroxyethylacrylate monomer | 28 |
| Acrylic acid | 10 |
| Allyl methacrylate monomer | 5 |
| Diacetone alcohol | 50 |
| N-propanol | 450 |
| Ethanol | 200 |
| Azo bis-isobutyronitrile | 4 |
| Portion 2 | |
| Methyl methacrylate monomer | 212 |
| Butyl methacrylate monomer | 256 |
| 2-hydroxyethylacrylate monomer | 52 |
| Acrylic acid monomer | 20 |
| Allyl methacrylate monomer | 10 |
| Azo bis-isobutyronitrile | 12 |
| Portion 3 | |
| Azo bis-isobutyronitrile | 3 |
| Portion 4 | |
| Acrylamide | 140 |
| Deionized water | 100 |
| Ethanol | 100 |
| Portion 5 | |
| Tertiarybutyl peroxy pivalate | 8 |
| Ethanol | 50 |
| Portion 6 | |
| Tertiary-butyl peroxy pivalate | 2 |
| Ethanol | 10 |
| Portion 7 | |
| Deionized water | 1700 |
| Total | 3689 |

Portion 1 is pre-mixed and charged into a reaction vessel equipped with a stirrer, a reflux condenser, a thermometer, and a heating mantle and heated to about 88°C. Then 75% of Portion 2 is slowly added for a thirty minute period. The remaining 25 percent of Portion 2 is mixed with Portion 3 and added over a thirty minute period, while maintaining the reaction mixture at about 88°C. The reaction mixture is maintained at about 89°C. for an additional sixty minutes and Portions 4 and 5 are added over a thirty minute period, and then Portion 6 is added over a five minute period and the reaction mixture is held at a slight relfux temperature of about 83°C. for thirty minutes. Then Portion 7 is slowly added over a 35 minute period. A fine polymer dispersion results. The polymer dispersion has a total solids content of about 28.6 percent and a Gardner Holdt viscosity measured at 25°C. of about H. The polymer has an acid number of 22.7 and a relative viscosity of 1.267 measured at 25°C. in dichloroethylene using a 0.5 percent polymer solution. The graft copolymer is of the following theoretical composition; backbone 34% methyl methacrylate, 39.5% butyl methacrylate, 8% hydroxyethylacrylate, 3% acrylic acid, 1.5% allylmethacrylate graft side portion, 14% acrylamide.

A linear acrylic polymer solution is prepared as follows:

| Portion 1 | Parts by Weight |
|---|---|
| Ethylene glycol monobutyl ether | 624 |
| Ethylene glycol monoethyl ether | 500 |
| Ethylene glycol monoethyl ether acetate | 300 |
| Anhydrous isopropanol | 31 |
| Portion 2 | |
| Methyl methacrylate monomer | 870 |
| Butyl methyacrylate monomer | 450 |
| 2-Hydroxyethylacrylate monomer | 120 |
| Acrylic acid monomer | 60 |
| Ditertiary butyl peroxide | 45 |
| Total | 3000 |

Portion 1 is charged into a reaction vessel equipped as indicated above and heated to about 136°C. and Portion 2 is slowly added over a four hour period, while maintaining the reaction mixture at a reflux temperature of about 131°C. After Portion 2 is added the reaction mixture is held at its reflux temperature of about 133°C. for an additional sixty minutes.

The resulting acrylic polymer solution has a solids content of about 49.9 percent and a Gardner Holdt viscosity measured at 25°C. of about Y. The polymer has an acid number of 31.4 and a relative viscosity of 1.103 measured at 25°C. using 0.5 percent polymer solids in dichloroethylene. The polymer is 58% methyl methacrylate, 30% butyl methacrylate, 8% 2-hydroxyethylacrylate, 4% acrylic acid.

A coating composition is prepared as follows:

| | Parts by Weight |
|---|---|
| Acrylic graft copolymer solution (prepared above) | 36.50 |
| Linear acrylic polymer solution (prepared above) | 8.00 |
| Diethylethanol amine | 0.26 |
| Deionized water | 48.00 |
| 7.50 Hexakis(methoxymethyl) melamine | |
| | Total 100.26 |

The above ingredients are thoroughly blended together following the procedure of Example 1 to form a coating composition that has a total solids content of about 20 percent. The dispersion is fine and stable at room temperature and has a medium viscosity. The dispersion is sprayed onto a phosphatized steel panel and baked for thirty minutes at 135°C. The resulting film has a good gloss, a good appearance and excellent adhesion to the substrate and is resistant to solvents such as acetone and methylethyl ketone.

EXAMPLE 4

The graft copolymer solution is prepared as follows:

| Portion 1 | Parts by Weight |
|---|---|
| Methyl methacrylate monomer | 100.0 |
| Butyl methacrylate monomer | 185.0 |
| 2-Hydroxyethylacrylate monomer | 8.0 |
| Acrylic acid monomer | 7.5 |
| Allyl methacrylate monomer | 2.5 |
| Ethylene glycol monobutyl ether | 60.0 |
| n-Propanol | 300.0 |
| Portion 2 | |
| Ethanol | 240.0 |
| Portion 3 | |
| Azo bis-isobutyronitrile | 4.5 |
| Portion 4 | |
| Methylmethacrylate monomer | 200.0 |
| Butyl methacrylate monomer | 202.0 |
| 2-Hydroxyethylacrylate monomer | 32.0 |
| Acrylic acid monomer | 32.5 |
| Allyl methacrylate | 10.5 |
| Azo bis-isobutyronitrile | 12.0 |
| Portion 5 | |
| Azo bis-isobutyronitrile | 4.0 |
| Portion 6 | |
| 2-Hydroxyethylacrylate | 120.0 |
| Acrylamide | 100.0 |
| n-Propanol | 200.0 |
| Ethanol | 60.0 |
| Tertiary-butyl peroxy pivalate | 10.0 |

| Portion 1 | Parts by Weight |
|---|---|
| Deionized water | 100.0 |
| Portion 7 | |
| Tertiary-butyl peroxy pivalate | 4.0 |
| Portion 8 | |
| Deionized water | 1740.0 |
| | Total 3734.5 |

Portion 1 is pre-mixed and charged into a reaction vessel equipped with a stirrer, a reflux condenser, a heating mantle and the thermometer, and heated to about 85°C. Portion 2 is added over a five minute period and the reaction mixture is brought to its reflux temperature. Portion 3 is then added and then 40 percent of Portion 4 is added over a twenty minute period. Then 35 percent of Portion 4 is added over a 40 minute period and the remainder of Portion 4 is pre-mixed with Portion 5 and added over a 60 minute period. The reaction mixture is then held at its reflux temperature for about sixty minutes and about 75 percent of Portion 6 is added over a twenty-three minute period and the remainder of Portion 6 is mixed with Portion 7 and added over a ten minute period and the reaction mixture is maintained at its reflux temperature for an additional thirty minutes. Portion 8 is then slowly added for a thirty minute period to form the dispersion.

The resulting polymer dispersion has a solids content of 27.3 percent and a Gardner Holdt viscosity measured at 25°C. of P. The polymer has an acid number of 29.2 and a relative viscosity of 1.209 measured at 25°C. using 0.5 percent solids in dichloroethylene. The graft copolymer has the following theoretical composition: backbone 30% methyl methacrylate, 38.7% butyl methacrylate, 4% 2-hydroxyethylacrylate, 4% acrylic acid, 1.3% allyl methacrylate and the grafted side chain, 12% 2-hydroxyethylacrylate and 10% acrylamide.

A linear acrylic polymer solution is prepared as follows:

| Portion 1 | Parts by Weight |
|---|---|
| Ethylene glycol monobutyl ether | 624 |
| Ethylene glycol monoethyl ether | 500 |
| Ethylene glycol monoethyl ether acetate | 300 |
| Anhydrous isopropanol | 31 |
| Portion 2 | |
| Methyl methacrylate monomer | 1020 |
| Butyl acrylate monomer | 300 |
| 2-Hydroxyethylacrylate monomer | 122 |
| Acrylic acid monomer | 58 |
| Ditertiary butyl peroxide | 45 |
| Total | 3000 |

Portion 1 is pre-mixed and charged into a reaction vessel equipped as above and heated to its reflux temperature of about 140°C. Portion 2 is pre-mixed and added over a 4 hour period while maintaining the reaction mixture at its reflux temperature. The reaction mixture is held at its reflux temperature for an additional one and one-half hours.

The resulting polymer solution has a total solids content of 49.7 percent and a Gardner Holdt viscosity measured at 25°C. of X. The polymer has an acid number of 29.8 and a relative viscosity of 1.052 measured at 25°C. using a 0.5 percent polymer solids solution in dichloroethylene. The polymer is of 68% methyl methacrylate, 20% butyl acrylate, 8% 2-hydroxyethylacrylate and 4% acrylic acid. A coating composition is prepared as follows:

|  | Parts By Weight |
|---|---|
| Graft copolymer dispersion (prepared above) | 48.00 |
| Linear acrylic polymer solution (prepared above) | 4.00 |
| Hexakis(methoxymethyl)melamine | 6.30 |
| Diethylethanol amine | 0.24 |
| Deionized water | 42.00 |
| Total | 100.54 |

The above ingredients are blended together following the procedure of Example 1 to provide coating compositions having a solids content of 20 percent. The composition is diluted with water to a spray viscosity and is sprayed onto a primed steel panel and baked at 135°C. for 30 minutes to form a clear, glossy film that has excellent adhesion to the substrate and has excellent solvent resistance.

What is claimed is:

1. An aqueous coating composition having a film-forming binder content of about 2-60 percent by weight, and correspondingly, 40-98 percent by weight of water and up to 20 percent by weight of a solvent for the binder; wherein the binder consists essentially of
   1. 40-70 percent by weight, based on the weight fo the binder, of an acrylic polymer comprising a graft copolymer having the general structure A—B, where A is the backbone segment comprising 65-93 percent by weight of the copolymer and B is the graft side chain segment comprising 35-7 percent of the graft copolymer; the acrylic polymer is formed by polymerizing the following monomers to form the backbone segment A
      a. 55-80 percent by weight, based on the weight of the graft copolymer, of at least 25 percent by weight methyl methacrylate, and an alkyl methacrylate having two to 12 carbon atoms in the alkyl group or an alkyl acrylate having one to eight carbon atoms in the alkyl group;
      b. 2-20 percent by weight, based on the weight of the graft copolymer, of a hydroxy alkyl acrylate or a hydroxy alkyl methacrylate each having two to four carbon atoms in the alkyl group;
      c. 1-8 percent by weight, based on the weight of the graft copolymer, of an α,β-ethylenically unsaturated carboxylic acid;
      d. 0.5-3 percent by weight, based on the weight of the graft copolymer, of a monomer which is the grafting site for the side chain of the formula

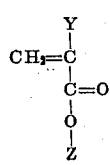

where Y is hydrogen, $CH_3$ or $CH_2$—$CH_3$ and Z is

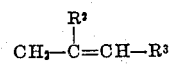

where $R^2$ and $R^3$ are Y; and polymerizing the following monomers with tee above reaction product to form the side chain segment (B) of the graft copolymer;
      e. 7-20 percent by weight, based on the weight of the graft copolymer, of acrylamide or methacrylamide, and
      f. 0-15 percent by weight, based on the weight of the graft copolymer, of a hydroxy alkyl acrylate or a hydroxy alkyl methacrylate each having two to four carbon atoms in the alkyl group; said graft copolymer having a relative viscosity of about 1.1-1.3;
   2. 10-30 percent by weight, based on the weight of the binder, of a linear acrylic polymer consisting essentially of
      a. 30-75 percent by weight, based on the weight of the acrylic polymer, of methyl methacrylate;
      b. 15-52 percent by weight, based on the weight of the acrylic polymer, of an alkyl methacrylate having two to 12 carbon atoms in the alkyl group or an alkyl acrylate having one to eight carbon atoms in the alkyl group;
      c. 2-10 percent by weight, based on the weight of the acrylic polymer, of a hydroxy alkyl acrylate or a hydroxy alkyl methacrylate each having two to four carbon atoms in the alkyl group;
      d. 2-8 percent by weight, based on the weight of the acrylic polymer, of an α,β-ethylenically unsaturated carboxylic acid; wherein the acrylic polymer has a relative viscosity of about 1.04-1.11; and the linear acrylic polymer is 75-100 percent neutralized with ammonia or an amine;
   3. 29-40 percent by weight, based on the weight of the binder, of a water-dispersible or water-soluble cross-linking resin selected from the group consisting of an alkylated melamine formaldehyde resin having one to four carbon atoms in the alkyl group and a urea formaldehyde resin;

wherein the relative viscosity of each of said acrylic polymers is measured in dichloroethylene at 0.5 percent polymer solids at 25°C.

2. The aqueous coating composition of claim 1 having a film-forming binder content of about 20-50 percent by weight and correspondingly, 50-80 percent by weight of water; wherein the binder consists essentially of 40-55 percent by weight of the acrylic polymer comprising the graft copolymer, 15-25 percent by weight of the linear acrylic polymer and 25-35 percent by weight of a water dispersible alkylated melamine formaldehyde resin.

3. The coating composition of claim 2 containing 0.1-30 percent by weight of pigment.

4. The coating composition of claim 3 in which the grafting side monomer for the graft copolymer is allyl methacrylate.

5. The coating composition of claim 4 in which the acrylic graft copolymer comprises 75-88 percent by weight of backbone segment A and correspondingly 15-25 percent by weight of the graft side chain segment B.

6. The coating composition of claim 5 in which the acrylic graft copolymer is prepared by polymerizing the following monomers to form the backbone segment (A),
a. 60–80 percent by weight, based on weight fo the graft copolymer, of at least 28 percent by weight methylmethacrylate and alkylmethacrylate having two to four carbon atoms in the alkyl group;
b. 4–12 percent by weight, based on weight of the graft copolymer, of hydroxyalkylarcylate or a hydroxyalkylmethacrylate having two to four carbon atoms in the alkyl group;
c. 3–6 percent by weight, based on weight of the graft copolymer, of acrylic acid or methacrylic acid;
d. 1–2 percent by weight, based on weight of the graft copolymer, of allylmethacrylate which is the grafting side for the side chain segment (B);
e. 8–14 percent by weight, based on weight of the graft copolymer, of a side chain segment of acrylamide;
f. 0–12 percent by weight based on weight of the graft copolymer, of hydroxyalkylacrylate of a hydroxyalkylmethacrylate having two to four carbon atoms in the alkyl group; said graft copolymer having a relative viscosity of about 1.15–1.25.

7. The aqueous coating composition of claim 2 in which the linear acrylic polymer consists essentially of 45–70 percent by weight of methylmethacrylate, 20–45 percent by weight of butylacrylate or butylmethacrylate, 5–10 percent by weight hydroxyethylacrylate or hydroxypropylmethacrylate and 3–5 percent by weight of acrylic acid or methacrylic acid;
wherein the acrylic polymer has the relative viscosity of 1.04–1.07.

8. The coating composition of claim 2 in whicethe water-dispersible cross-linking resin is hexakis(methoxymethyl)melamine.

9. The aqueous coating composition of claim 1 having a film-forming binder content of about 20–50 percent by weight and correspondingly 50–80 percent by weight of water and up to 20 percent by weight of the solvent for the binder; wherein the binder consists essentially of
1. 40–60 percent by weight, based on the weight of the binder, of an acrylic polymer comprising a graft copolymer having the general structure A—B where A is the backbone segment and comprises 75–88 percenr by weight of the copolymer and B is the graft side chain segment and correspondingly comprises 12–25 percent by weight of the graft copolymer; the acrylic polymer is formed by polymerizing the following monomers to form the backbone segment (A)
 a. the 55–80 percent by weight, based on the weight of the graft copolymer, of at least 28 percent by weight of methylmethacrylate and an alkylmethacrylate having two to four carbon atoms in the alkyl group;
 b. 4–12 percent by weight, based on the weight of the graft copolymer of the hydroxyalkylacrylate the hydroxyalkylmethacrylate each having two to four carbon atoms in the alkyl group;
 c. 3–6 percent by weight, based on the weight of the graft copolymer, of acrylic acid or methacrylic acid;
 d. 1–2 percent by weight, based on the weight of the graft copolymer, of allylmethacrylate which is the grafting side chain segment; and polymerizing the following monomers with the above reaction product to form a side chain segment (B) of the graft copolymer;
 e. 8–14 percent by weight, based on the weight of the graft copolymer of acrylamide and
 f. 0–12 percent by weight, based on the weight of the graft copolymer of a hydroxylakylacrylate or a hydroxyalkylmethacrylate each having two to four carbon atoms in the alkyl group wherein the graft copolymer has a relative viscosity of about 1.15–1.25;
2. 15–20 percent by weight, based on the weight of the binder, of a linear acrylic polymer of
 a. 45–70 percent by weight, based on the weight of the acrylic polymer, of methylmethacrylate,
 b. 20–45 percent by weight, based on the weight of the acrylic polymer of butylacrylate or butylmethacrylate;
 c. 5–10 percent by weight, based on the weight of the acrylic polymer, of hydroxyethylacrylate;
 d. 3–5 percent by weight of acrylic acid or methacrylic acid; wherein the acrylic polymer has a relative viscosity of about 1.04–1.07 and is 75–100 percent neutralized with an alkyl alkanol amine;
3. 25–35 percent by weight, based on the weight of the binder, of an alkylated melamine formaldehyde resin having one to four carbon atoms in the alkyl group.

10. The aqueous coating composition of claim 3 wherein the binder consists essentially of
1. 40–55 percent by weight, based on the weight of the binder, of an acrylic copolymer comprising a graft copolymer prepared by polymerizing the following monomers to form the backbone segment A
 a. 32–36 percent by weight, based on the weight of the graft copolymer, of methylmethacrylate, of 35–39 percent by weight, based on the weight of the graft copolymer, of butylmethacrylate;
 b. 6–10 percent by weight, based on the weight of the graft copolymer, of hydroxyethylacrylate;
 c. 2–5 percent by weight, based on the weight of the graft copolymer, of acrylic acid;
 d. 1–2 percent by weight, based on the weight of the graft copolymer, of allylmethacrylate which forms a grafting site of the copolymer;
 e. polymerizing the following monomers with the above reaction product to form the side chain segments (B) of the graft copolymer; 2–6 percent by weight, based on the weight of the graft copolymer hydroxyethylacrylate, 10–14 percent by weight, based on the weight of the graft copolymer, of acrylamide;
2. 15–25 percent by weight, based on the weight of the binder, of a linear acrylic polymer of 46–48 percent by weight, based on the weight of the acrylic polymer, of methylmethacrylate, 38–42 percent by weight, based on the weight of the acrylic polymer, of butylmethacrylate, 4–8 percent by weight, based on the weight of the acrylic polymer of hydroxyethylacrylate and 5–7 percent by weight, based on the weight of the acrylic polymer, acrylic acid.
3. 25–35 percent by weight, based on the weight of the binder, of hexakis(methoxymethyl) melamine.

11. The coating composition of claim 3 wherein the binder consists essentially of
1. an acrylic polymer comprising a graft copolymer prepared by polymerizing the following monomers to form backbone segment (A)
   a. 32–36 percent by weight, of methylmethacrylate and 38–41 percent by weight of butylmethacrylate;
   b. 6–10 percent by weight of hydroxyethylacrylate;
   c. 2–4 percent by weight of acrylic acid;
   d. 1–2 percent by weight of allylmethacrylate to which the side chain segments B are grafted which consists essentially of
   e. 12–16 percent by weight, based on the weight of the graft copolymers, of acrylamide;
2. a linear acrylic polymer consisting essentially of 50–60 percent by weight, based on the weight of the acrylic polymer of methylmethacrylate, 28–32 percent by weight of butylmethacrylate, 6–10 percent by weight of hydroxyethylacrylate and 3–5 percent by weight of acrylic acid;
3. hexakis(methoxymethyl)melamine.

12. The aqueous coating composition of claim 3 wherein the binder consists essentially of
1. an acrylic polymer comprising a graft copolymer prepared by polymerizing the following monomer as to form the backbone of segment (A)
   a. 27–31 percent by weight, based on the weight of the graft copolymer, of methylmethacrylate and 38–42 percent by weight of butylmethacrylate,
   b. 10–14 percent by weight, based on the weight of the graft copolymer, of hydroxy ethylacrylate;
   c. 3–5 percent by weight, based on the weight of the graft copolymer, of acrylic acid,
   d. 1–2 percent by weight, based on the weight of the graft copolymer, of allylmethacrylate to which the side chain segment (B) is grafted which is the reaction product of the following monomers:
   e. 10–12 percent by weight of acrylamide;
   f. 2–4 percent by weight of hydroxyethyl acrylate;

2. a linear acrylic polymer consisting essentially of 50–60 percent by weight, based on the weight of the acrylic polymer, of methylmethacrylate, 28–32 percent by weight of butylmethacrylate, 6–10 percent by weight of hydroxyethylacrylate and 3–5 percent by weight of acrylic acid; and
3. hexakis(methoxymethyl)melamine.

13. The aqueous coating composition of claim 3 wherein the binder consists essentially of
1. an acrylic polymer comprising a graft copolymer wherein the backbone segment (A) is formed by polymerizing the following monomers:
   a. 28–32 percent by weight, based on the weight of the graft copolymer, of methylmethacrylate and 37–41 percent by weight of methylmethacrylate;

b. 2–6 percent by weight, based on the weight of the graft copolymer, of hydroxyethylacrylate;
   c. 3–5 percent by weight, based on the weight of the graft copolymer, of acrylic acid;
   d. 1–2 percent by weight based on the weight of the graft copolymer of allylmethacrylate to which the side chain segments (B) are grafted which are the polymerization product of the following monomers:
   e. 10–14 percent by weight, based on the weight of the graft copolymer, of hydroxyethylacrylate and f. 8–12 percent by weight, based on the weight of the graft copolymer of acrylamide;
2. a linear acrylic polymer consisting essentially ofb 66–70 percent by weight of methylmethacrylate, 18–22 percent by weight of butylacrylate, 6–10 percent by weight of hydroxy ethylacrylate and 3–5 percent by weight of acrylic acid; and
3. hexakis(methoxymethyl)melamine.

* * * * *